UNITED STATES PATENT OFFICE 2,282,320

PREPARATION OF HIGHER MOLECULAR WEIGHT ALIPHATIC CARBOXYLIC ACYL HALIDES

Frank J. Cahn, Chicago, Ill., assignor to The Emulsol Corporation, Chicago, Ill., a corporation of Illinois No Drawing. Application August 4, 1940,
Serial No. 351,441

8 Claims. (Cl. 260—408)

This invention relates to the preparation of higher molecular weight aliphatic carboxylic acyl halides and is particularly concerned with novel improvements in the method of preparation of such compounds wherein the yields are very high and the process relatively simple to operate.

Acyl halides have heretofore been produced from fatty acids containing up to 5 carbon atoms, as well as from longer chain fatty acids, by reaction with phosphorous trichloride. The yields or recovery, particularly of the higher molecular weight acyl halides, have been quite poor, much decomposition resulting, for example, in the vacuum distillation of the products in order to obtain substantially pure acyl halide compositions. Efforts to overcome these difficulties have resulted in such suggestions as the employment of water or hydrochloric acid as a catalyst and the conducting of the operations under super-atmospheric pressure. While bringing about some improvement, such processes have left much to be desired since they have proven to be rather cumbersome to operate.

In accordance with the present invention, substantially pure acyl halides may be produced from higher molecular weight aliphatic carboxylic acids by reaction with a phosphorous trihalide, particularly phosphorous trichloride, under certain conditions, followed by certain specific procedures, hereinafter described in detail.

In general, the process of the present invention involves reacting the higher molecular weight aliphatic carboxylic acid with at least one-third of a mol of phosphorous trichloride at relatively low temperatures whereby hydrochloric acid is evolved. The reaction mixture is then preferably permitted to cool and the lower layer of phosphorous acid is drawn off. The upper layer, containing the desired acyl halide, is then subjected to a vacuum, preferably while passing a dry gas therethrough, and while simultaneously heating to a temperature sufficient to drive off the excess or unreacted phosphorous trichloride.

The following example is illustrative of the novel process of the present invention. It will be understood that various changes may be made therein, as indicated hereinafter, without departing from the spirit of the invention.

Example 200 pounds of lauric acid, or a product comprising predominantly lauric acid such as coconut oil mixed fatty acids, are placed in a glass lined kettle and brought up to a temperature of about 40 degrees C. There are then added thereto 68.5 pounds of phosphorous trichloride at 40 degrees C., and the mixture is heated slowly, for example, over a period of about 15 minutes, to approximately 60 degrees C., with stirring. The heating and stirring are continued for about another 15 minutes during which time the temperature rises to 90 degrees C. Care should be exercised to avoid local super-heating. The hydrochloric acid which is evolved is absorbed in ice. The reaction mass is then allowed to cool to about 40 degrees C. to 50 degrees C. over a period of an hour or two and the lower layer of phosphorous acid is drawn off. It may be pointed out that it is exceedingly important to effect substantially complete removal of the lower layer of phosphorous acid since, otherwise, poor yields of the desired acyl halide will result when the further steps of the process are carried out as hereinafter set forth. After the lower layer of phosphorous acid has been essentially completely drawn off, the upper layer is subjected to a vacuum, preferably about one-third atmosphere absolute, and a stream of carbon dioxide gas is passed therethrough while simultaneously heating at about 130 degrees C. for approximately one-half hour. This results in effectively removing the excess or unreacted phosphorous trichloride. The resulting product comprises substantially 100% pure lauroyl chloride or, if coconut oil mixed fatty acids were initially employed, substantially pure acyl halides corresponding to the fatty acids present in said coconut oil mixed fatty acids.

The process is of particular utility in connection with the preparation of acyl halides from aliphatic carboxylic acids containing at least 12 carbon atoms, and preferably from 12 to 18 carbon atoms, although it can be employed with fairly good results in connection with the treatment of aliphatic carboxylic acids containing as low as 8 carbon atoms or containing substantially more than 18 carbon atoms. Among the higher aliphatic acids which may be treated in accordance with the process of the present invention to produce corresponding acyl halides are, for example, caprylic acid, capric acid, oleic acid, ricinoleic acid, stearic acid, melissic acid, ricineladic acid, ricinostearolic acid, linoleic acid, linolenic acid, myristic acid, palmitic acid, mixtures of any two or more of the above mentioned acids or other similar acids, mixed higher fatty acids derived from animal and vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oil, whale oil, shark oil, and other fish oils as well as higher molecular weight fatty acids derived from the aforementioned partially or completely hydrogenated oils. The process is, however, of special utility in connection with the preparation of acyl halides from lauric acid or higher fatty acids comprising predominantly lauric acid such as coconut oil mixed fatty acids.

The temperature at which the higher molecular weight aliphatic carboxylic acids and the phosphorous trichloride are reacted to produce the acyl halides should preferably be between about 40 degrees C. and about 90 degrees C. Lower temperatures may, however, be employed in certain cases but the time for the reaction to go to substantial completion is, of course, substantially increased. For best results, the temperature should be in the neighborhood of 80 degrees C. to 90 degrees C. and, in no case, should exceed around 100 degrees C.

As pointed out in the example hereinabove, after the drawing off of the lower layer of phosphorous acid, the acyl halide is treated in vacuo while passing an inert gas therethrough and while simultaneously heating to an elevated temperature to drive off the unreacted or excess phosphorous trichloride. It is not necessary that an inert gas be employed, the drawing of a partial vacuum being, in itself, adequate although the step of removal of the phosphorous trichloride takes a considerably longer period of time. Again, an inert gas may be used without the employment of any vacuum but, here, also, this does not represent the preferred procedure. The term "inert," as applied to the gases which are passed through the acyl halide mixture to aid in the removal of the phosphorous trichloride, is intended to cover dry gases or, in other words, gases which are inert with respect to the acyl halide. Thus, for example, instead of carbon dioxide or nitrogen or the like, dry air may be used.

The temperature at which the acyl halide mixture is heated, while subjecting it to a vacuum and passage therethrough of an inert gas, must, of course, be sufficiently high to result in the removal of the excess or unreacted phosphorous trichloride. Lower temperatures than the preferred range of approximately 120 degrees C. to 130 degrees C. may, of course, be employed but, the length of time required to effect removal of the phosphorous trichloride is increased. Higher temperatures may also be utilized but, in the usual case, offer no particular advantage over the preferred range. Under any circumstances, of course, the temperature must not be sufficiently high so as to distill, decompose or otherwise deleteriously affect the acyl halide.

In order to obtain fully satisfactory results, the phosphorous trichloride should be employed in the molal ratio of at least about $\frac{1}{3}$ mol of the phosphorous trichloride to one mol of the higher molecular weight aliphatic carboxylic acid. For best results, an approximately 50% excess of the phosphorous trichloride should be used, that is, about $\frac{1}{2}$ mol to one mol of the carboxylic acid.

What I claim as new and desire to protect by Letters Patent of the United States is:

1. A method of producing high purity acyl halides from aliphatic carboxylic acids containing at least 8 carbon atoms which comprises reacting said acids with a phosphorous trihalide in a molal ratio of at least about $\frac{1}{3}$ mol of phosphorous trihalide for each mol of carboxylic acid whereby hydrohalic acid is evolved, said reaction being conducted at a temperature not exceeding approximately 100 degrees C., substantially completely drawing off from the reaction mass the layer of phosphorous acid which forms in the reaction, and subjecting the remaining acyl halide mixture to a temperature in excess of about 100 degrees C. to drive off unreacted phosphorous trihalide whereby a high purity acyl halide is produced.

2. A method of producing high purity acyl halides from aliphatic carboxylic acids containing from 12 to 18 carbon atoms which comprises reacting said acids with phosphorous trichloride in a molal ratio of at least $\frac{1}{3}$ mol of phosphorous trichloride for each mol of carboxylic acid at a temperature between about 40 degrees C. and 90 degrees C. whereby hydrochloric acid is evolved, substantially completely drawing off from the reaction mass the lower layer of phosphorous acid which forms in the reaction, and subjecting the remaining acyl halide mixture to a partial vacuum and simultaneously heating to a temperature in excess of about 100 degrees C. to drive off unreacted phosphorous trichloride whereby a high purity acyl halide is produced.

3. A method of producing substantially pure acyl halides from fatty acids containing from 12 to 18 carbons atoms which comprises reacting said fatty acids with phosphorous trichloride in a molal ratio of the order of $\frac{1}{2}$ mol of phosphorous trichloride for each mol of fatty acid at a temperature between about 60 degrees C. and 90 degrees C. whereby hydrochloric acid is evolved, allowing the reaction mass to cool, substantially completely drawing off from the reaction mass the lower layer of phosphorous acid which forms in the reaction, and subjecting the remaining acyl halide mixture to a partial vacuum while passing an inert gas therethrough and simultaneously heating to a temperature in excess of 100 degrees C. to drive off unreacted phosphorous trichloride whereby a substantially pure acyl halide is produced.

4. A method of producing substantially pure acyl halides from fatty acids containing from 12 to 18 carbon atoms which comprises reacting said acids with phosphorous trichloride in a molal ratio of more than $\frac{1}{3}$ mol of phosphorous trichloride for each mol of fatty acid at a temperature between about 40 degrees C. and 100 degrees C. whereby hydrochloric acid is evolved, allowing the reaction mass to cool, substantially completely drawing off from the reaction mass the lower layer of phosphorous acid which forms in the reaction, and subjecting the remaining acyl halide mixture to a partial vacuum while passing an inert gas therethrough and simultaneously heating to a temperature of about 120 degrees C. to 130 degrees C. to drive off unreacted phosphorous trichloride whereby a substantially pure acyl halide is produced.

5. A method of producing substantially pure acyl halides from coconut oil mixed fatty acids which comprises reacting said acids with phosphorous trichloride in a molal ratio of the order of $\frac{1}{2}$ mol of phosphorous trichloride for each mol of said fatty acids at a temperature between about 40 degrees C. and 90 degrees C. whereby hydrochloric acid is evolved, allowing the reaction mass to cool, substantially completely drawing off from the reaction mass the lower layer of phosphorous acid which forms in the reaction, and subjecting the remaining acyl halide mixture to a partial vacuum while passing an inert gas therethrough and simultaneously heating to a temperature of the order of 130 degrees C. to drive off unreacted phosphorous trichloride whereby a substantially pure acyl halide is produced.

6. A method of producing high purity acyl halides from fatty acids containing at least predominantly lauric acid which comprises reacting said fatty acids with phosphorous trichloride in a molal ratio of the order of ½ mol of phosphorous trichloride for each mol of fatty acids at a temperature between about 40 degrees C. and 90 degrees C. whereby hydrochloric acid is evolved, allowing the reaction mass to cool, substantially completely drawing off from the reaction mass the lower layer of phosphorous acid which forms in the reaction, and subjecting the remaining acyl halide mixture to a partial vacuum while passing dry carbon dioxide gas therethrough and simultaneously heating to a temperature of the order of 130 degrees C. to drive off unreacted phosphorous trichloride whereby a high purity acyl halide is produced.

7. A method of producing acyl halides from aliphatic carboxylic acids containing at least 8 carbon atoms which comprises reacting said acids with a phosphorous trihalide in a molal ratio of more than ⅓ mol of phosphorous trihalide for each mol of carboxylic acid whereby hydrohalic acid is evolved, said reaction being conducted at a temperature not exceeding approximately 100 degrees C., substantially completely drawing off from the reaction mass the layer of phosphorous acid which forms in the reaction, and subjecting the remaining acyl halide mixture to a temperature in excess of about 100 degrees C. to drive off unreacted phosphorous trihalide whereby a high purity acyl halide is produced.

8. A method of producing acyl halides from aliphatic carboxylic acids containing from 12 to 18 carbon atoms which comprises reacting said acids with phosphorous trichloride in a molal ratio of more than ⅓ mol of phosphorous trichloride for each mol of carboxylic acid at a temperature between about 40 degrees C. and 90 degrees C. whereby hydrochloric acid is evolved, substantially completely drawing off from the reaction mass the lower layer of phosphorous acid which forms in the reaction, and subjecting the remaining acyl halide mixture to a partial vacuum and simultaneously heating to a temperature in excess of about 100 degrees C. to drive off unreacted phosphorous trichloride whereby a high purity acyl halide is produced.

FRANK J. CAHN.